Nov. 12, 1946.   G. P. BUNN   2,410,960

HIGH TEMPERATURE VALVE

Filed Nov. 23, 1943   Sheets-Sheet 1

INVENTOR
GEORGE P. BUNN
BY Hudson Young & Yinger
ATTORNEYS

Nov. 12, 1946.    G. P. BUNN    2,410,960
HIGH TEMPERATURE VALVE
Filed Nov. 23, 1943    2 Sheets-Sheet 2

INVENTOR
GEORGE P. BUNN
BY *Hudson Young & Yinger*
ATTORNEYS

Patented Nov. 12, 1946

2,410,960

UNITED STATES PATENT OFFICE 2,410,960

HIGH TEMPERATURE VALVE

George P. Bunn, Bartlesville, Okla., assignor to Phillips Petroleum Company, a corporation of Delaware Application November 23, 1943, Serial No. 511,441

17 Claims. (Cl. 251—20)

This invention relates to valves for controlling the flow of all kinds of fluids, especially valves operating under high temperatures, and it has particular relation to valves handling fluids containing catalysts in refineries under temperatures of from about 600° F. up to 2600° F. and higher. It is still more closely related to valves providing for streamlined flow and resistance to corrosion in which the packing of the valve operating means leading to the exterior is protected from the high temperature of the stream of hot fluid.

The temperatures used in many chemical processes keep getting higher and higher as time goes by. As better yields may be obtained by these high temperatures it is imperative that valves be obtained to handle high temperature fluids, as the present valves are not standing up on the job. The catalysts used in butadiene plants are poisoned by oxidizable metals, so the present requirements for the metal parts are for special steel alloys. These alloys unfortunately are generally very brittle, especially at 1100° and up, and may register only 1 to 2 foot pounds on the Charpy test as compared to 7 pounds and over for cast iron. My valve is not limited to the use of alloys however.

The present packing materials that can be used in stuffing boxes to resist the escape of the catalyst and hot fluid all fail soon at temperatures above 600° F. This use of brittle metal and packing material which cannot stand the temperature requires the invention of a new type of valve. This results in a field of invention having entirely different problems and greater limitations than exist in designing a valve for ordinary liquid such as cold water. Obviously however, my valve may also be used successfully in handling cold fluids just as well as hot fluids. By proper proportioning of parts there is no upper limit to the high temperature of fluids handled so far as the packing is concerned.

The principal object of my invention is to design the valve so that the packing for the metal parts moving the valve will not be subjected to the high temperature of the fluid flowing in the conduit.

Another object of the invention is to devise a streamlined valve in which the flow of fluid will occur with a minimum of turbulence and erosion of the valve seat.

Another object is to provide a valve in which unequal expansion between the valve seat and disc will not interfere with proper operation even though parts may be made of brittle material.

Another object is to provide a valve in which temperature changes will not cause misalignment of the valve head but in which the head will always close on the seat.

Another object is to provide a valve in which the packing is protected by being out of the stream of flowing fluid, by radiation of heat away from the packing, by deflection of the fluid from the packing or by any one or more of these inventive ideas.

Another object is to provide such a valve in which rotary seating motion of the valve head can be accomplished.

Other objects are to provide novel features of design and construction of parts which result in a valve which is cheap from a relative standpoint, which is efficient in operation, capable of giving long service without repair, and which will carry out all of the above objects.

Numerous further objects and advantages will be obvious to those skilled in the art upon reading the following specification, looking at the accompanying drawings, and studying over the appended claims.

In the drawings:

Figure 8 shows a modified form of the ring gear and pinion gears of Figure 1 and illustrates an external drive by a motor.

Figure 1:
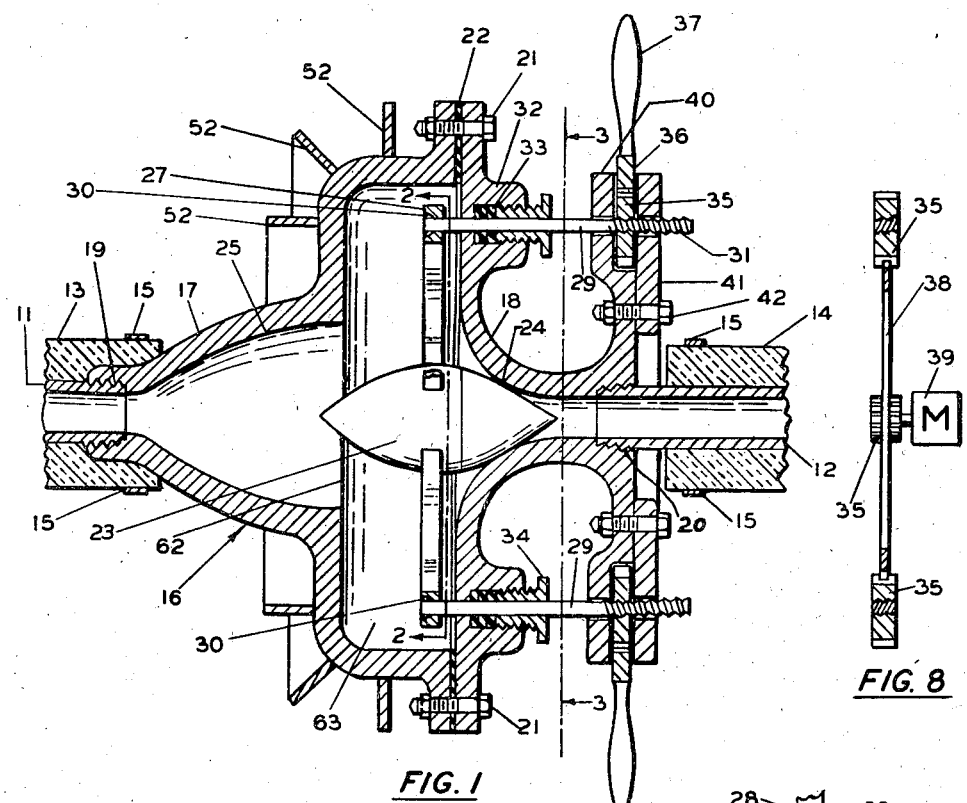
Figure 1 is a cross sectional view of a valve embodying the invention; the cross section being taken through the axis of the fluid conducting pipes.

In Figure 1, pipes 11 and 12 are transporting a corrosive high temperature material, although of course my valve is adapted to work with low temperature neutral materials which are much more easily handled. To conserve the heat in the materials pipes 11 and 12 may be covered with heat insulating cylinders 13 and 14, although this heat insulation may be dispensed with and is not involved in my invention. The heat insulating material may be held in place by metallic bands 15, although any other suitable holding means may be employed.

There are three major features to Figure 1. The first is the provision of streamlined flow of the fluid material and the location of the packing material in a secluded spot away from the streamlined flow. The second is the provision of heat transfer means to cool the packing to its proper operating temperature. And the third is the construction of the valve head out of brittle material in such a way as to make it easily operated and not subject to being rendered ineffective by temperature changes. There are other important advantages in Figure 1 which will be obvious from its future description.

In order to control and to stop the flow of the hot fluid material in pipes 11 and 12 a valve generally indicated as 16 is provided between them. Valve 16 comprises two casings 17 and 18 which are secured to pipes 11 and 12 by any suitable connection whatsoever, screw threads 19 and 20 respectively being shown. The two halves of the casings 17 and 18 may be secured together by nuts and bolts 21 and preferably the joint between them is packed by a gasket of some sort such as 22. A valve head 23 is adapted, as will be explained further, to seat on a valve seat 24 forming a portion of the bore of casing 18.

Valve 23 is shown as a prolate ellipsoid so that streamlined laminar flow may occur around it without turbulence. To cooperate with the shape of the valve head, the casing 17 is provided with a semi-ellipsoidal inner surface 25. While certain streamlined shapes have been shown, it is obvious that the shape of parts 23 and 25 may be modified without invention by following engineering aerodynamic or hydraulic design and still be within the scope of this invention as long as they allow the fluid to diverge around head 23 and converge to the rear of the head to pass through seat 24 and into pipe 12 with a minimum amount of turbulence. A rough double cone shape of part 23 may be sufficient in some cases. The head 23 may be made in the popular teardrop shape.

Figure 2:
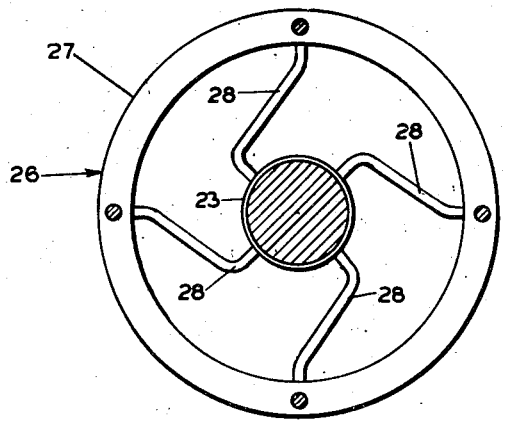
Figure 2 is a cross sectional view of the ellipsoidal valve head and its operating spider, taken along the line 2—2 of Figure 1 looking in the direction indicated.
Figure 3:
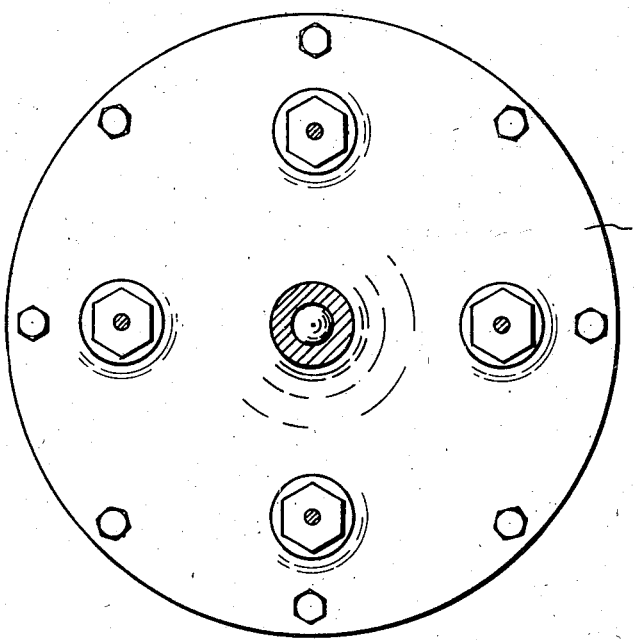
Figure 3 is an elevational view of the housing plate containing the valve seat with parts in cross section, the cross section being taken along the line 3—3 in Figure 1 looking in the direction indicated.

As seen in Figures 1 and 2, head 23 is supported in position by a spider 26, the spider consisting of a rim 27 and a plurality of spokes 28. While it is possible to obtain some operation with one spoke and two or three spokes will give good operation I show four spokes although of course five or more spokes may be employed. The number of spokes involved is not a limiting factor to my invention. Spokes 28 may be straight if they are materials of suitable coefficients of temperature expansion. I may however have the spokes provided with an S-bend as shown in Figure 2 to provide for inequalities of expansion without warping of the valve head from its seating position as will be explained under the operation of the device below. I prefer to cast the head, spokes and rim integral although of course they may be made separately and welded together or otherwise assembled.

Rim 27 is provided with a plurality of studs 29 which may be integral therewith but preferably are secured thereto by welds 30. The number of studs again is immaterial but preferably enough of them should be provided to prevent jamming of the device in operation.

Studs 29 are provided with threads 31 at their ends and studs 29 pass through stuffing boxes 32 containing packing rings 33 which may be provided with a gland 34. Stuffing box 32 prevents the escape of the fluid from the casing along the surface of the rod or stud 29.

In order to operate rods or studs 29, various forms of operating means may be provided but in the modification shown in Figure 1, I prefer to use internally threaded pinions 35, one threaded on each screw threaded portion 31, all of the pinions being rotated by a single internal ring gear 36 which may be turned by means of handles or capstan bars 37 on the exterior thereof. Obviously other forms of handles may be provided, or gear teeth could be provided on exterior of ring gear 36 for drive by a motor, or a motor may be positioned and provided with a gear to drive the internal teeth of 36, the motor being spaced around the periphery from the pinions 35.

Figure 8 shows another form of ring gear 38 which is mounted interiorly of the pinions 35 and is driven by a motor 39 which may drive a separate pinion or which may, as shown, drive one of the pinions 35 by means of a sleeve, secured to the pinion, the armature of the motor in this instance being made hollow to allow the passage therethrough of screw threads 31. Many other types of drive may be provided.

Returning to Figure 1, the ring gear may be held in place and guided by flange 40 which is shown integral with housing 18 and flange 41 which is shown bolted to 18 by means of bolts 42.

Figures 5, 6:
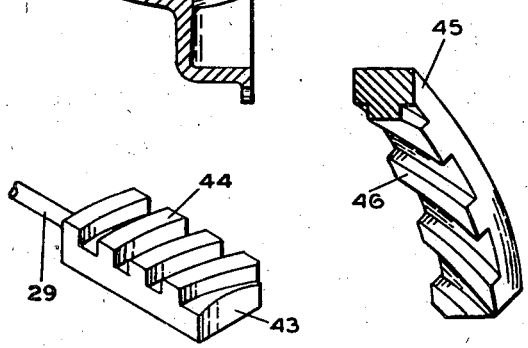
Figure 5 is a perspective view of a modified form of operating gear which may be placed on the ends of the studs in place of the screws shown in Figure 1.
Figure 6 is a fragmentary perspective view of the type of ring gear designed to cooperate with Figure 5.
Figure 7:
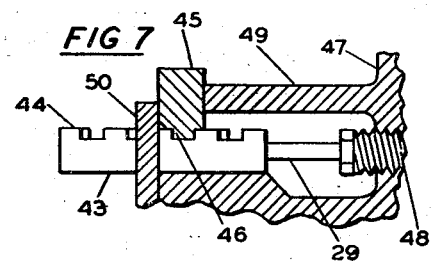
Figure 7 is a cross sectional fragmentary view showing the operative relationship of the parts illustrated in Figures 5 and 6.

Other means may be substituted for screw threads 31, and Figure 5 shows a block 43 and diagonal threads 44 cut therein for cooperation with the structure of Figure 5 which shows a ring gear formed internally with teeth 46 which are adapted to cooperate with teeth 44 as shown in Figure 7 where valve housing 47 is provided with stuffing box 48, guide flange 49 and removable flange 50. The operating rod 29 provided with gear block 43 is moved in and out of stuffing box 48 as ring gear 45 is rotated in its channel between 50 and 49 and as teeth 46 on the ring gear urges teeth 44 in or out through a guide hole in flange 50.

Figure 4:
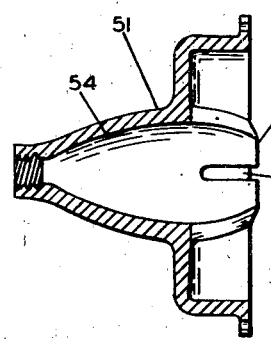
Figure 4 is a cross sectional view of an alternative form of streamlined housing on a reduced scale which may be substituted for the corresponding element in Figure 1 as will be explained below.

Figure 4 shows a modified form of casing 17 which is designated as casing 51. Casing 51 differs from casing 17 by not being provided with cooling fins 52 shown in Figure 1. This is meant to show that cooling fins 52 may be eliminated from the structure of Figure 4 if desired. The fins 52 may be made radial to add strength to the housing 17 if desired, and may be placed on housing 18 also if desired.

Casing 51 also differs by being provided with projections 53 which form a continuation of the ellipsoidal surface 25 of Figure 1 which is designated as ellipsoidal surface 54. Projections 53 allow a space 55 for the passage of the arms 28 of the spider of Figure 2. No attempt is made to seal around these arms, in fact space 55 has to be made wide enough for temperature distortion of the entire structure in Figure 1, the ends of 53 preferably being located a little short of surface 24 to prevent warping of the parts and breakage of the relatively brittle materials employed, but may contact 24 if desired.

Figure 9:
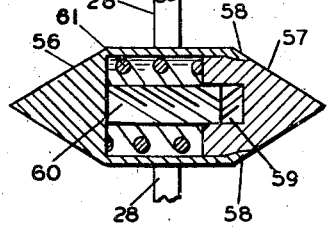
Figure 9 shows a modified form of the valve head in which rotary seating motion is incorporated in cross section.

In Figure 9 a modified form of head 23 is shown. Spokes 28 are formed integral with a head 56 which guides a seating element 57. The rim 58 of the cylindrical end of head 56 may be bent or otherwise equipped to secure element 57 from coming out. Element 57 has a screw-threaded bore 59 threaded on a screw-threaded stud 60 which is preferably integral with 56. A spring 61 urges 56 and 57 apart. 58 may be threaded to 56 if brittle metal is used.

The operation of the valve is very simple and believed almost obvious from the drawings. In Figure 1, the valve is shown in closed position. To open the valve, bars 37 are turned rotating pinions 36 and screwing the pinions on screw 31 to drive rod 29 to the left by reaction against plate 41. Ellipsoid 23 moves out until it is centrally located between seat 24 and surface 25. This provides a streamlined flow around the ellipsoid with a minimum of turbulence as the flow passes over lip 62 and space 63. The flow is preferably from left to right so that fluid pressure will aid in seating the valve, but obviously the valve will work with flow in the opposite direction. Space 63 being a quiet backwater and having radiation to the air through casings 17 and 18, which radiation may be increased by fins 52, it is much cooler in the vicinity of packing 33. Depending on the viscosity of the fluid and its thermal conductivity, proper proportion of parts may be made by non-inventive engineering calculations so that while the temperature of the fluid flowing over ellipsoid 23 and out pipe 12 may have a temperature of 1400° F. to 1600° F. and higher, the temperature of the packing 33 may still be below 600° F. The distance between the axis of the valve and the stuffing boxes 32 may be much greater in proportion to the width of space 63 than as shown for low viscosity and high heat transfer characteristics of certain fluids, or for greater temperature differences.

As the structure in Figure 2 expands due to temperature, the valve head 23 will not spring away from or toward seat 24 but instead will rotate a small amount as arms 28 lengthen.

On the other hand, if arms 28 do not undergo too much expansion they may be made radial.

The operation of the structure of Figure 4 is similar to that of Figure 1. When the housing 17 of Figure 1 is removed and housing 51 substituted therefor, the abutments 53 help keep the fluid in streamlined flow, and because of this it may be possible to reduce the diameter of space 63 and/or to reduce or eliminate cooling fins 52 as there will not be as much heat transfer through minor amounts of turbulence as when the housing 17 is used.

The operation of Figures 5, 6, and 7 is merely that ring gear 45 is rotated causing teeth 46 to mesh with teeth 44 and drive the rod 29 in or out of stuffing box 48 operating the spider 26 in the same manner as in Figure 1.

The operation of motor 39 in Figure 8 is believed obvious as it rotates gear 35 which drives ring gear 38 and treated pinions 36.

The operation of Figure 9 is the same as Figure 1 except that as spokes 28 urge head 56 to the seat, seating element 57 is forcibly rotated by screw 60 which is threaded in bore 59 with a very steep thread. Spring 61 is compressed and the seating element 57 given a rotating motion to wipe its way into a tight seat with seat 24, while the outside of 56, 57 is shown as a simple cone head obviously the same principle may be non-inventively applied to the more streamlined heads, such as head 23 in Figure 1. The outer surface of 56 and 57 may be perfectly streamlined in expanded position, and when in contracted position need not be streamlined as there is no flow as the valve is closed when 56 and 57 are telescoped together.

Minor changes in design and construction of parts may, of course, be made without going outside of the scope of my invention. The principal features of my invention, which consist in keeping the packing at a suitable temperature, avoiding warping and other deleterious temperature changes and other features are all set forth in the following claims and my invention is only limited by these claims.

Having described my invention, I claim:

1. In a high temperature valve the combination comprising a housing having a fluid conduit and a non-fluid conducting portion therein, a seat in said conduit, a valve head mounted for sliding motion in said housing to close and open said seat, a plurality of stuffing boxes in said non-fluid conducting portion, a plurality of valve head operating means secured to said valve head and extending through said stuffing boxes to the exterior of said housing, and means to slide said valve head operating means in said stuffing boxes in unison, whereby any binding is obviated, comprising screw threads on the operating means, internally threaded pinions threaded on said screw threads, an annular gear having teeth meshing with all of the pinions simultaneously, and means to rotate said annular gear, each stuffing box having its respective axis parallel to the axis of movement of the valve head whereby the valve head operating means may slide therein to slide the valve head.

2. In a high temperature valve the combination comprising a housing having a fluid conduit and a non-fluid conducting portion therein, a seat in said conduit, a valve head mounted for sliding motion in said housing to close and open said seat, a plurality of stuffing boxes in said non-fluid conducting portion, a plurality of valve head operating means secured to said valve head and extending through said stuffing boxes to the exterior of said housing, and means to slide said valve head operating means in said stuffing boxes in unison, whereby any binding is obviated, comprising screw threads on the operating means, internally threaded pinions threaded on said screw threads, and an annular gear having teeth meshing with all of the pinions simultaneously, each stuffing box having its respective axis parallel to the axis of movement of the valve head whereby the valve head operating means may slide therein to slide the valve head.

3. In a high temperature valve the combination comprising a housing having a fluid conduit and a non-fluid conducting portion therein, a seat in said conduit, a valve head mounted for sliding motion in said housing to close and open said seat, a plurality of stuffing boxes in said non-fluid conducting portion, a plurality of valve head operating means secured to said valve head and extending through said stuffing boxes to the exterior of said housing, and means to slide said valve head operating means in said stuffing boxes in unison, whereby any binding is obviated, comprising a gear block on each operating means and an annular gear having teeth meshing with all the gear blocks simultaneously to move the operating means in unison, and means to rotate said annular gear, each stuffing box having its respective axis parallel to the axis of movement of the valve head whereby the valve head operating means may slide therein to slide the valve heat.

4. A valve for high temperature fluids comprising in combination a housing having a streamlined fluid conducting conduit therethrough and a fluid stagnating chamber therein, slots in the walls of said conduit communicating with said chamber, a streamlined valve head disposed in said conduit, a seating portion on said valve head, a portion of said conduit forming a valve seat for said seating portion, a spider in said stagnating chamber supporting said valve head by curved arms which rotate the valve head on heating extending through said slots, rods on said spider in said stagnating chamber extending to the exterior of said housing, stuffing boxes at portions of said stagnating chamber remote from and cooler than said conduit and sealing said housing to said rods, screw threads on said rods, a gear threaded to each rod, means for rotating all of said gears in unison comprising a hand wheel having external radial handles and internal gearing meshing with each of said gears, whereby upon rotating said gears in the proper directions said seating portion contacts and leaves said seat opening and closing said valve, and means on said valve head comprising said seating portion helically splined to said valve head and spring pressed to an extended position for rotary wiping contact with said seat upon closing of said valve, said rods being disposed parallel to the axis of movement of said valve head at all times.

5. A valve for high temperature fluids comprising in combination a housing having a streamlined fluid conducting conduit therethrough and a fluid stagnating chamber therein communicating with said chamber, a streamlined valve head disposed in said conduit, a seating portion on said valve head, a portion of said conduit forming a valve seat for said seating portion, a spider in said stagnating chamber supporting said valve head by arms, rods on said spider in said stagnating chamber extending to the exterior of said housing, stuffing boxes at portions of said stagnating chamber remote from and cooler than said conduit and sealing said housing to said rods, screw threads on said rods, a gear threaded to each rod, means for rotating all of said gears in unison comprising a hand wheel having external radial handles and internal gearing meshing with each of said gears, whereby upon rotating said gears in the proper directions said seating portion contacts and leaves said seat opening and closing said valve, and means on said valve head comprising said seating portion helically splined to said valve head and spring pressed to an extended position for rotary wiping contact with said seat upon closing of said valve, said rods being disposed parallel to the axis of movement of said valve head at all times.

6. A valve for high temperature fluids comprising in combination a housing having a streamlined fluid conducting conduit therethrough and a fluid stagnating chamber therein communicating with said chamber, a streamlined valve head disposed in said conduit, a seating portion on said valve head, a portion of said conduit forming a valve seat for said seating portion, a spider in said stagnating chamber supporting said valve head by arms, rods on said spider in said stagnating chamber extending to the exterior of said housing, stuffing boxes at portions of said stagnating chamber remote from and cooler than said conduit and sealing said housing to said rods, screw threads on said rods, a gear threaded to each rod, means for rotating all of said gears in unison comprising a hand wheel having external radial handles and internal gearing meshing with each of said gears, whereby upon rotating said gears in the proper directions said seating portion contacts and leaves said seat opening and closing said valve, and means on said valve head comprising said seating portion for rotary wiping contact with said seat upon closing of said valve, said rods being disposed parallel to the axis of movement of said valve head at all times.

7. A valve for high temperature fluids comprising in combination a housing having a streamlined fluid conducting conduit therethrough and a fluid stagnating chamber therein, communicating with said chamber, a streamlined valve head disposed in said conduit, a seating portion on said valve head, a portion of said conduit forming a valve seat for said seating portion, a spider in said stagnating chamber supporting said valve head by arms, rods on said spider in said stagnating chamber extending to the exterior of said housing, stuffing boxes at portions of said stagnating chamber remote from and cooler than said conduit and sealing said housing to said rods, screw threads on said rods, a gear threaded to each rod, and means for rotating all of said gears in unison comprising a hand wheel having external radial handles and internal gearing meshing with each of said gears, whereby upon rotating said gears in the proper direction said seating portion contacts and leaves said seat opening and closing said valve, said rods being disposed parallel to the axis of movement of said valve head at all times.

8. A valve for high temperature fluids comprising in combination a housing having a fluid conducting conduit therethrough and a fluid stagnating chamber therein, slots in the walls of said conduit communicating with said chamber, a valve head disposed in said conduit, a seating portion on said valve head, a portion of said conduit forming a valve seat for said seating portion, a spider in said stagnating chamber supporting said valve head extending through said slots, rods on said spider in said stagnating chamber extending to the exterior of said housing, screw threads on said rods, a gear threaded to each rod, means for rotating all of said gears in unison, whereby upon rotating said gears in the proper directions said seating portion contacts and leaves said seat opening and closing said valve, and means on said valve head comprising said seating portion helically splined to said valve head and spring pressed to an extended position for rotary wiping contact with said seat upon closing of said valve, said rods being disposed parallel to the axis of movement of said valve head at all times.

9. A valve for high temperature fluids comprising in combination a housing having a fluid conducting conduit therethrough and a fluid stagnating chamber therein, slots in the walls of said conduit communicating with said chamber, a valve head disposed in said conduit, a seating portion on said valve head, a portion of said conduit forming a valve seat for said seating portion, a spider in said stagnating chamber supporting said valve head extending through said slots, rods on said spider in said stagnating chamber extending to the exterior of said housing, and means on said valve head comprising said seating portion helically splined to said valve head and spring pressed to an extended position for rotary wiping contact with said seat upon closing of said valve, said rods being disposed parallel to the axis of movement of said valve head at all times.

10. A valve for high temperature fluids comprising in combination a housing having a fluid conducting conduit therethrough and a fluid stagnating chamber therein communicating with said chamber, a valve head disposed in said conduit, a seating portion on said valve head, a portion of said conduit forming a valve seat for said seating portion, a spider in said stagnating chamber supporting said valve head and means on said valve head comprising said seating portion helically splined to said valve head and spring pressed to an extended position for rotary wiping contact with said seat upon closing of said valve.

11. A valve for high temperature fluids comprising in combination a housing having a fluid conducting conduit therethrough and a fluid stagnating chamber therein, slots in the walls of said conduit communicating with said chamber, a valve head disposed in said conduit, a seating portion on said valve head, a portion of said conduit forming a valve seat for said seating portion, a spider in said stagnating chamber supporting said valve head extending through said slots, rods on said spider in said stagnating chamber extending to the exterior of said housing, screw threads on said rods, a gear threaded to each rod and means for rotating all of said gears in unison, whereby upon rotating said gears in the proper directions said seating portion contacts and leaves said seat opening and closing said valve, said rods being disposed parallel to the axis of movement of said valve head at all times.

12. A valve for high temperature fluids comprising in combination a housing having a fluid conducting conduit therethrough and a fluid stagnating chamber therein, slots in the walls of said conduit communicating with said chamber, a valve head disposed in said conduit, a seating portion on said valve head, a portion of said conduit forming a valve seat for said seating portion, a spider in said stagnating chamber supporting said valve head extending through said slots, and rods on said spider in said stagnating chamber extending to the exterior of said housing, said rods being disposed parallel to the axis of movement of said valve head at all times.

13. A valve for high temperature fluids comprising in combination a housing having a fluid conducting conduit therethrough and a fluid stagnating chamber therein, slots in the walls of said conduit communicating with said chamber, a valve head disposed in said conduit, a seating portion on said valve head, a portion of said conduit forming a valve seat for said seating portion, and a spider in said stagnating chamber supporting said valve head extending through said slots.

14. A valve for high temperature fluids comprising in combination a housing having a fluid conducting conduit therethrough and a fluid stagnating chamber therein communicating with said chamber, a valve head disposed in said conduit, a seating portion on said valve head, a portion of said conduit forming a valve seat for said seating portion, and a spider in said stagnating chamber supporting said valve head and means on said valve head comprising said seating portion for rotary wiping contact with said seat upon closing of said valve.

15. A valve for high temperatures comprising in combination a housing having a fluid conducting conduit therethrough, a valve head disposed in said conduit a seating portion on said valve head, a portion of said conduit forming a valve seat for said seating portion, a spider guided in said housing for moving said valve head to and from said seat, said spider comprising an outer guided portion and arms connecting said outer portion and said valve head, said arms being generally spirally disposed outwardly from said valve head in the plane defined by said outer portion, and said arms being thicker in a direction normal to said plane than in said plane whereby upon temperature changes the valve head will rotate as the arms change length and not be substantially translated relative to said plane.

16. A valve for high temperatures comprising in combination a housing having a fluid conducting conduit therethrough, a valve head disposed in said conduit, a seating portion on said valve head, a portion of said conduit forming a valve seat for said seating portion, a spider guided in said housing for moving said valve head to and from said seat, said spider comprising an outer guided portion and arms connecting said outer portion and said valve head, said arms being generally spirally disposed outwardly from said valve head in the plane defined by said outer portion, whereby upon temperature changes the valve head will rotate as the arms change length and not be substantially translated relative to said plane.

17. A valve for high temperatures comprising in combination a housing having a fluid conducting conduit therethrough, a valve head disposed in said conduit, a seating portion on said valve head, a portion of said conduit forming a valve seat for said seating portion, a spider guided in said housing for moving said valve head to and from said seat, said spider comprising an outer guided portion and arms connecting said outer portion and said valve head, said arms being generally spirally disposed outwardly from said valve head whereby upon temperature changes the valve head will rotate as the arms change length and not be substantially translated relative to said plane.

GEORGE P. BUNN.